A. L. SESSIONS.
WHIFFLETREE HOOK.
APPLICATION FILED APR. 1, 1909.
1,053,541.
Patented Feb. 18, 1913.
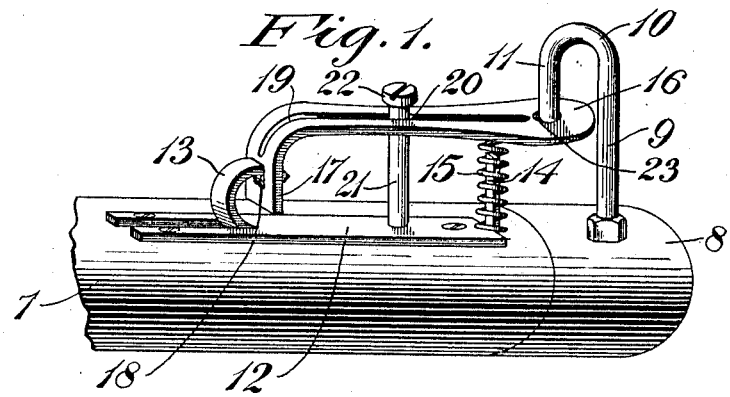
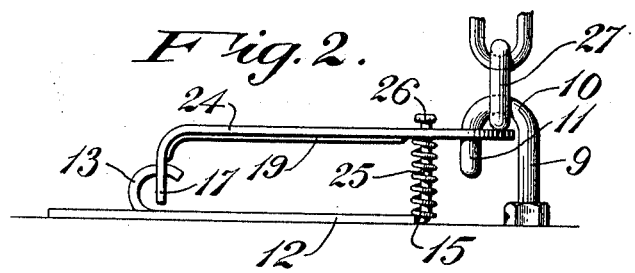
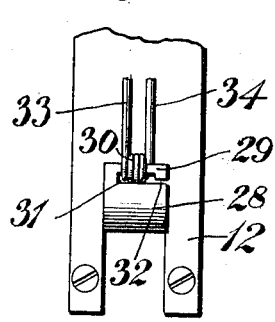
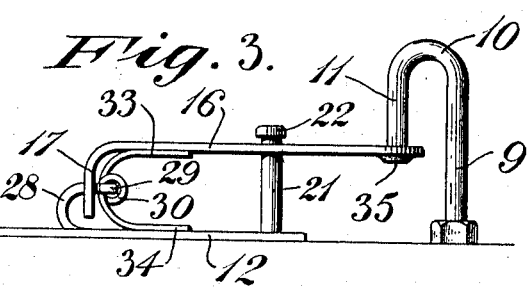
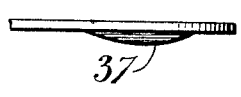
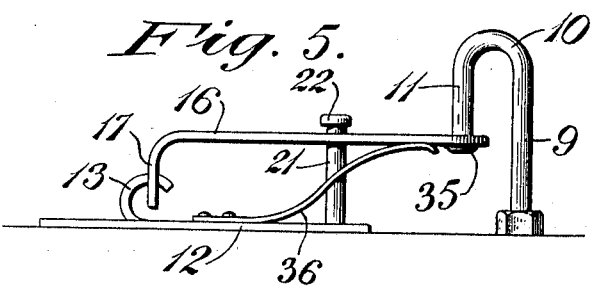
Witnesses
L. S. Grotta
R. E. Berkowitch
Inventor:
Albert L. Sessions
by Arthur B. Jenkins
Attorney
COLUMBIA PLANOGRAPH CO., WASHINGTON, D. C.

UNITED STATES PATENT OFFICE.

ALBERT L. SESSIONS, OF BRISTOL, CONNECTICUT.

WHIFFLETREE-HOOK.

1,053,541.   Specification of Letters Patent.   Patented Feb. 18, 1913.

Application filed April 1, 1909. Serial No. 487,285.

*To all whom it may concern:*

Be it known that I, ALBERT L. SESSIONS, a citizen of the United States, and a resident of Bristol, in the county of Hartford and State of Connecticut, have invented a new and Improved Whiffletree-Hook, of which the following is a specification.

My invention relates to the class of devices more generally employed for attaching a trace to a whiffletree, and the object of the invention is to provide a device of this class having novel features of advantage and utility.

One form of device in the use of which the object sought may be attained is illustrated in the accompanying drawings, in which—

Figure 1 is a perspective view of the end of a whiffletree provided with my improved fastener. Fig. 2 is a view in side elevation showing a slightly different construction of device embodying my invention. Fig. 3 is a like view showing a trace-hook of a still different construction and embodying my invention. Fig. 4 is a top plan view of a portion of the device shown in Fig. 3. Fig. 5 is a view in side elevation of a device embodying a still different construction. Fig. 6 is a detail view showing another means of forming the depression in the retaining plate.

My invention is especially adapted for use in attaching the trace of a harness to a whiffletree, and for this reason the device is shown and described herein with reference to such a part. I do not, however, limit myself to the use of the fastener in connection with a trace, as it may find ready use in connection with other parts of a harness or vehicle, or even in other structures than those relating to harness or vehicles, and any use will thus be deemed to be a use of the invention.

My improved fastener embodies a device the parts of which may be readily and cheaply formed and quickly assembled and when so assembled constitute a fastener of extreme durability and one particularly efficient for the purpose to which it may be applied.

In the accompanying drawings the numeral 7 denotes the end of a whiffletree which may be supplied with a ferrule 8. A hook 9 is secured to the whiffletree in any desired manner, and this hook may be rigidly secured against rotating or other movement, or may be allowed rotation, and it may or may not extend through the whiffletree or may be secured to the ferrule 8. I prefer, however, to secure the hook against turning movement. The hook is formed into a goose-neck 10 located at a proper distance from the whiffletree, and the end 11 of the hook projects backward toward the whiffletree.

A base-plate 12 is secured to the whiffletree in any desired manner, screws being shown herein for such purpose, and a tail 13 is located on this base-plate, preferably being upturned from the metal forming the plate, although such structure is not absolutely essential. At the opposite end of the plate a spring support 14 is located projecting outwardly from the plate and preferably formed integral therewith, although such construction is not necessary. A spring 15 is mounted on this spring support in position to engage the under surface of a retaining plate 16. This retaining plate is preferably formed from sheet metal having a bent end 17 in which a slot 18 is formed for the reception of the tail 13. This retaining plate may be corrugated as at 19, and it has an opening 20 for the reception of a stop pin 21 preferably secured to the base-plate 12. The hole 20 is of sufficient size to allow all the movement required to the retaining plate 16, and the end of the stop pin 21 is headed as at 22 for engagement with the stop plate to limit its outward movement under the influence of the spring 15 should the end of the hook 9 be moved from over the end of the plate. A depression 23 is formed in the end of the retaining plate, preferably as by forcing a part of the metal downward to form the depression. The retaining pin 21 as herein shown is in the form of a screw secured to the base-plate.

In the structure shown in Fig. 2 the base-plate 12, hook 9 and tail 13 are similar in construction to the parts above described. The plate 24 instead of having a depression formed for engagement of the end 11 of the hook has an opening formed entirely through the plate, through which the end of the hook may project. The plate 12 is bent upward forming a spring support 25 for the spring 15. In this form of the device, however, the means for preventing undue movement of the plate under the influence of the spring is constituted in a head 26 on the end of the pin 25, the pin, of course, projecting through the plate. The plate may have the corrugation 19 as shown in Fig. 1 of the drawings. In this form of the device the end 11 of the hook passing through the plate allows the plate to swing close to the goose-neck 10 in which a ring or link 27 of a chain attached to a trace or like part is engaged. The spring 15 presses the plate against such ring or link holding it tightly in place and prevents any rattling or undue movement.

In the form of the structure shown in Figs. 3 and 4 the hook 9, base-plate 12 and retaining plate 16 are practically of the same form as shown in Fig. 1. The base-plate also has the retaining pin 21 headed as at 22 to prevent undue movement of the plate 16. The tail 28, however, has a bar 29 formed at its end upon which a spring 30 is mounted. In the preferred form of construction this bar forms one side of a recess 31 into which a slot 32 extends as a means of placing the spring. The slot 32 may be left of sufficient width to introduce the spring and then may be closed against the tail. Branches 33, 34 press against the retaining plate and base-plate, respectively, forcing the former outward.

In the construction shown in Fig. 5 the base-plate 12, tail 13, hook 9 and pin 21 are of the same construction as shown in Fig. 1, the end of the hook 11 engaging in a depression formed by depressing the metal as at 35. A leaf spring 36 in this form of construction is attached to the base-plate and with its outer free end presses against the plate 16 to retain it in engagement with the end of the hook 11.

In the form of construction shown in Fig. 6 instead of a circular depression being formed in the retaining plate for the reception of the end of the hook, the metal is depressed as at 37, this depression extending for some distance lengthwise of the plate and its walls being preferably parallel each with the other.

While I have shown and described herein preferred forms of construction embodying the invention, these may be departed from more or less without avoiding such invention, and I do not therefore limit myself to the precise construction herein shown and described.

I claim—

1. A whiffletree, a hook swivelly secured thereto, a base plate mounted on said whiffletree, a retaining plate pivotally connected with the base plate, means for forcing the retaining plate against the end of the hook, and means for limiting the outward movement of the retaining plate when disengaged from the hook.

2. A whiffletree, a hook swivelly secured thereto, a base plate mounted on said whiffletree, a retaining plate pivotally connected with the base plate, a pin secured to the base plate and having a head overlying the retaining plate to limit its outward movement when disengaged from the hook.

3. A base-plate, a retaining plate having an opening, a pivotal connection uniting said plates, means for forcing the plates apart, and a hook with its end arranged to pass into said opening in the retaining plate to locate said plate close against the bend in the hook.

4. A base-plate, a retaining plate pivotally connected therewith, said retaining plate having an opening, means for forcing the plates apart, and a hook located beyond the end of the retaining plate and with its end positioned to enter said opening to locate the retaining plate close against the bend in the hook.

5. A base-plate slotted at one end, a tail upturned from the metal between said slots, a retaining plate having an opening to engage said tail whereby said parts are pivotally connected, a pin formed by an upturned reduced portion of said base-plate at the end opposite the tail, means on said pin for limiting the swinging movement of the retaining plate, a spring on said pin to force the retaining plate away from the base-plate, and a hook to engage the end of the retaining plate.

ALBERT L. SESSIONS.

Witnesses:
ARTHUR B. JENKINS,
LENA E. BERKOVITCH.

Copies of this patent may be obtained for five cents each, by addressing the "Commissioner of Patents. Washington, D. C."